(12) United States Patent
Ishibashi et al.

(10) Patent No.: US 9,045,583 B2
(45) Date of Patent: Jun. 2, 2015

(54) POLYURETHANE RESIN ADHESION PIGMENT, PIGMENT DISPERSION COMPOSITION AND INKJET INK COMPOSITION

(75) Inventors: Yukari Ishibashi, Tokyo (JP); Asami Takenaka, Tokyo (JP); Shigehiro Tanaka, Tokyo (JP)

(73) Assignee: TOKAI CARBON CO., LTD., Tokyo (JP)

(*) Notice: Subject to any disclaimer, the term of this patent is extended or adjusted under 35 U.S.C. 154(b) by 250 days.

(21) Appl. No.: 13/701,106

(22) PCT Filed: May 30, 2011

(86) PCT No.: PCT/JP2011/062383
§ 371 (c)(1),
(2), (4) Date: Mar. 12, 2013

(87) PCT Pub. No.: WO2011/152353
PCT Pub. Date: Dec. 8, 2011

(65) Prior Publication Data
US 2013/0165584 A1    Jun. 27, 2013

(30) Foreign Application Priority Data
May 31, 2010 (JP) ................ 2010-123966

(51) Int. Cl.
| C09D 5/00 | (2006.01) |
|---|---|
| C09D 11/00 | (2014.01) |
| C08J 3/00 | (2006.01) |
| C08K 3/20 | (2006.01) |
| C08L 75/00 | (2006.01) |
| C08G 18/08 | (2006.01) |
| C08G 18/28 | (2006.01) |
| C08G 18/83 | (2006.01) |
| C09D 11/322 | (2014.01) |
| C08K 3/04 | (2006.01) |
| C08L 75/12 | (2006.01) |
| C08L 75/04 | (2006.01) |
| C09D 7/12 | (2006.01) |
| C09D 17/00 | (2006.01) |
| C09D 175/12 | (2006.01) |
| C09D 175/04 | (2006.01) |
| C09D 11/326 | (2014.01) |
| C09C 3/10 | (2006.01) |
| C09D 11/324 | (2014.01) |
| C09C 1/56 | (2006.01) |
| C09C 1/48 | (2006.01) |
| C09D 11/102 | (2014.01) |

(52) U.S. Cl.
CPC .............. *C08G 18/83* (2013.01); *C09D 11/322* (2013.01); *C08G 18/2875* (2013.01); *C08G 18/831* (2013.01); *C08G 18/0823* (2013.01); *C08K 3/04* (2013.01); *C08L 75/12* (2013.01); *C08L 75/04* (2013.01); *C09D 7/1225* (2013.01); *C09D 17/005* (2013.01); *C09D 175/12* (2013.01); *C09D 175/04* (2013.01); *C09D 11/326* (2013.01); *C01P 2006/22* (2013.01); *C09C 3/10* (2013.01); *C09D 11/324* (2013.01); *C09C 1/565* (2013.01); *C01P 2006/12* (2013.01); *C01P 2006/19* (2013.01); *C09C 1/48* (2013.01); *C09D 11/102* (2013.01)

(58) Field of Classification Search
CPC .......... C08K 3/04; C08L 75/04; C08L 75/12; C08G 18/0823; C08G 18/83; C08G 18/2875; C08G 18/831; C01P 2006/12; C01P 2006/19; C01P 2006/22; C09C 1/565; C09C 1/48; C09C 3/10; C09D 11/102; C09D 11/322; C09D 11/324; C09D 11/326; C09D 7/1225; C09D 17/005; C09D 175/04; C09D 175/12
USPC .......... 523/160, 161; 524/589, 590, 591, 839, 524/840
See application file for complete search history.

(56) References Cited

U.S. PATENT DOCUMENTS

| 5,969,002 A * | 10/1999 | Kijlstra et al. ............... 523/160 |
| 6,506,899 B1 * | 1/2003 | Simms ........................ 544/222 |
| 6,852,156 B2 * | 2/2005 | Yeh et al. ................... 106/31.6 |
| 2010/0143589 A1 * | 6/2010 | Spinelli et al. ............... 427/256 |

FOREIGN PATENT DOCUMENTS

| DE | 10 2008 010 687 A1 | 9/2009 |
| EP | 827973 A1 | 3/1998 |

(Continued)

OTHER PUBLICATIONS

Extended European Search Report dated Jul. 15, 2014, issued in corresponding European Patent Application No. 11789756.1 (5 pages).

(Continued)

*Primary Examiner* — Patrick Niland
(74) *Attorney, Agent, or Firm* — Westerman, Hattori, Daniels & Adrian, LLP

(57) ABSTRACT

A pigment that exhibits excellent image density, dispersibility, storage stability, and resolubility, and forms an ink film that exhibits marker resistance and rubfastness is provided. A polyurethane resin-bonded pigment is produced by bringing (I) a pigment having a surface acidic group into contact with (II) a water-dispersible polyurethane resin having a tertiary amino group and an anionic polar group or a nonionic polar chain in an aqueous medium. The pigment (I) is preferably self-dispersible carbon black having a surface acidic group.

9 Claims, No Drawings

(56) References Cited

FOREIGN PATENT DOCUMENTS

| | | |
|---|---|---|
| JP | 8-003498 A | 1/1996 |
| JP | 08-218015 A | 8/1996 |
| JP | 2009-051926 A | 3/2009 |
| JP | 2009-241063 A | 10/2009 |
| JP | 2009-256636 A | 11/2009 |
| JP | 2010-007059 A | 1/2010 |
| JP | 2010-037427 A | 2/2010 |
| WO | 2009/103381 A1 | 8/2009 |
| WO | 2009/103881 A1 | 8/2009 |
| WO | 2011/027785 A1 | 3/2011 |

OTHER PUBLICATIONS

International Search Report of PCT/JP2011/062383, mailing date Aug. 30, 2011.

* cited by examiner

POLYURETHANE RESIN ADHESION PIGMENT, PIGMENT DISPERSION COMPOSITION AND INKJET INK COMPOSITION

TECHNICAL FIELD

The invention relates to a polyurethane resin-bonded pigment, a pigment dispersion composition, and an inkjet ink composition.

BACKGROUND ART

In recent years, an aqueous ink that is safe and has small environmental impact has been widely used in various fields instead of an organic solvent-based ink. In business applications or the like, an odorless aqueous coloring material is indispensable as an ink used for printing in offices. In industrial applications, there has been an increasing tendency to reduce the use of an organic solvent as much as possible from the viewpoint of an improvement in working environment, an improvement in safety of ink and paint, and waste disposal. An aqueous coloring material also has an advantage in that the production cost can be reduced as compared with an organic solvent-based coloring material since special equipment (e.g., explosion-proof system, ventilator, and organic solvent recovery unit) is unnecessary during production.

A dye or a pigment has been mainly used as the aqueous coloring material depending on the application. A dye can easily form a high-resolution image that exhibits an excellent tone, but exhibits poor light resistance as compared with a pigment. A pigment exhibits poor dispersibility as compared with a dye, but exhibits excellent water resistance and light resistance. A number of pigment inks have been developed along with the development of dispersion technique.

An aqueous liquid ink for gravure printing or offset printing has been developed. An inkjet recording method has been most widely used as an aqueous ink recording method for office applications.

The inkjet recording method discharges ink droplets from a minute nozzle head to record characters or figures on the surface of a recording medium (e.g., paper). The noncontact inkjet recording method can implement easy on-demand full-color printing of an image on various recording media (e.g., plain paper) without requiring a printing plate.

An inkjet printer that utilizes the inkjet recording method discharges ink droplets from a minute nozzle head to record characters or figures on the surface of a recording medium (e.g., paper). Typical inkjet printing methods include a Bubble Jet (registered trademark) method and a piezo method. The Bubble Jet method instantaneously heats an ink introduced into the nozzle head using a heater to produce bubbles, and intermittently discharges the ink by utilizing the volume expansion due to the bubbles. The piezo method converts an electrical signal into a mechanical signal using an electrostrictive element (piezoelectric element), and intermittently discharges ink droplets stored in the nozzle head.

A black inkjet printer ink composition (inkjet ink composition) has been widely used in offices and the like mainly in order to print documents. A number of aqueous black pigment ink compositions that are optimized for the recording method and the recording speed of each printer have been proposed.

For example, Patent Document 1 discloses an aqueous black pigment ink composition that is provided with improved dispersibility in an aqueous medium by hydrophilizing the surface of the black pigment. However, since the ink composition disclosed in Patent Document 1 may penetrate when printed on plain paper, a decrease in image density, offset, curling of the recording paper, and the like may occur. In particular, since the amount of ink discharged per unit time has increased along with an increase in printing speed of inkjet printers, a sufficient image density may not be obtained when using a related-art aqueous black pigment.

Since a pigment exhibits a strong interparticle cohesive force, but exhibits weak affinity to an organic polymer, water, an organic solvent, and the like, it is very difficult to uniformly mix or disperse a pigment under normal mixing or dispersion conditions. In order to deal with this problem, attempts have been made to improve the dispersibility of a pigment by improving the affinity of the pigment to a solid or liquid component by causing a dispersant (e.g., surfactant or resin) to be adsorbed on the surface of the pigment, or coating the entire surface of the pigment with the dispersant (see Patent Document 2, for example).

Since a printer used for industrial applications has a high press speed, and cannot be frequently subjected to head cleaning as compared with a printer used for personal applications, an inkjet ink composition that does not contaminate or clog the head during continuous or intermittent inkjet operations, and exhibits resolubility (i.e., the dried ink composition is redissolved in the undried ink composition, and that does not contaminate or clog the nozzle head during continuous or intermittent inkjet operations) has been desired. The same technical problem exists in the field of spray coating compositions and the like.

RELATED-ART DOCUMENT

Non-Patent Document

Patent Document 1: JP-A-08-003498
Patent Document 2: JP-A-08-218015

SUMMARY OF THE INVENTION

Technical Problem

The inventors of the invention conducted extensive studies, and found that an aqueous pigment ink composition in which a dispersant is adsorbed on the surface of a pigment has a problem in that the dispersant may be removed from the surface of the pigment due to a strong shear force that occurs when the ink composition is discharged from a thin nozzle of a nozzle head, or the dispersant may be removed from the surface of the pigment during long-term storage, so that the dispersion state of the pigment may become unstable (i.e., the storage stability may deteriorate). When a water-dispersible resin such as an acrylic emulsion is added to improve the rubfastness and the marker resistance of the ink film, a decrease in storage stability and discharge stability occurs. When forming a pigment microcapsule by coating the entire pigment with the dispersant, the image density significantly decreases in spite of excellent storage stability.

It has been known that a coloring agent that remains on the surface of printed matter such as paper without penetrating the printed matter as a result of decreasing the functional group concentration on the surface of the pigment achieves high image density. In this case, however, a decrease in dispersion stability, resolubility, and rubfastness occurs.

An object of the invention is to provide a pigment, a pigment dispersion composition, and an inkjet ink composition that can overcome the above trade-off relationship, may exhibit excellent image density, dispersibility, storage stability, and resolubility, and may form an ink film that exhibits marker resistance and rubfastness.

Solution to Problem

The inventors conducted extensive studies in order to solve the above technical problem, and found that the above technical problem can be solved by a polyurethane resin-bonded pigment that is produced by bringing (I) a pigment having a surface acidic group into contact with (II) a water-dispersible polyurethane resin having a tertiary amino group and an anionic polar group or a nonionic polar chain in an aqueous medium. This finding has led to the completion of the invention.

Several aspects of the invention relate to the following.
(1) A polyurethane resin-bonded pigment produced by bringing (I) a pigment having a surface acidic group into contact with (II) a water-dispersible polyurethane resin having a tertiary amino group and an anionic polar group or a nonionic polar chain in an aqueous medium.
(2) The polyurethane resin-bonded pigment according to (1), wherein the pigment (I) having a surface acidic group is self-dispersible carbon black having a surface acidic group.
(3) A pigment dispersion composition including the polyurethane resin-bonded pigment according to (1).
(4) A pigment dispersion composition including the polyurethane resin-bonded pigment according to (2).
(5) An inkjet ink composition including the polyurethane resin-bonded pigment according to (1).
(6) An inkjet ink composition including the polyurethane resin-bonded pigment according to (2). Note that the pigment (I) having a surface acidic group may be hereinafter referred to as "pigment (I)", and the water-dispersible polyurethane resin (II) having a tertiary amino group and an anionic polar group or a nonionic polar chain may be hereinafter referred to as "water-dispersible polyurethane resin (II)").

Advantageous Effects of the Invention

Since the polyurethane resin-bonded pigment is produced by bringing the pigment (I) having a surface acidic group into contact with the water-dispersible polyurethane resin (II) having a tertiary amino group and an anionic polar group or a nonionic polar chain in the aqueous medium, ionic attraction occurs between the surface acidic group of the pigment (I) and the surface functional group (tertiary amino group) of the water-dispersible polyurethane resin (II) so that the low-polarity main chain of the water-dispersible polyurethane resin (II) is physically adsorbed on the pigment (I), and the anionic polar group or nonionic polar chain of the water-dispersible polyurethane resin (II) exhibits affinity to the aqueous medium. The polyurethane resin-bonded pigment may thus exhibit excellent image density, dispersibility, storage stability, and resolubility, and may form an ink film that exhibits marker resistance and rubfastness.

The pigment dispersion composition and the inkjet ink composition may exhibit excellent image density, dispersibility, storage stability, and resolubility, and may form an ink film that exhibits marker resistance and rubfastness due to the polyurethane resin-bonded pigment.

DESCRIPTION OF EMBODIMENTS

A polyurethane resin-bonded pigment according to one embodiment of the invention is described below.

The polyurethane resin-bonded pigment according to one embodiment of the invention is produced by bringing (I) a pigment having a surface acidic group (hereinafter may be referred to as "pigment (I)") into contact with (II) a water-dispersible polyurethane resin having a tertiary amino group and an anionic polar group or a nonionic polar chain (hereinafter may be referred to as "water-dispersible polyurethane resin (II)") in an aqueous medium.

The pigment (I) used to produce the polyurethane resin-bonded pigment according to one embodiment of the invention is preferably a pigment having an acidic surface. Examples of such a pigment include a pigment that has been subjected to surface acidification using a synergist, and a pigment that has been acidified by surface treatment, and neutralized with a counter ion.

A black pigment is preferable as the pigment (I) used to produce the polyurethane resin-bonded pigment according to one embodiment of the invention. Specific examples of the black pigment include ivory black, peach black, lamp black, mars black, bitumen, titanium black, carbon black, and the like. Among these, carbon black that exhibits excellent blackness and tinting strength when used as an inkjet recording black pigment may preferably be used. It is particularly preferable to use self-dispersible carbon black having a surface acidic group from the viewpoint of the dispersibility, discharge stability, and the like of the ink composition.

The term "self-dispersible carbon black pigment having a surface acidic group" used herein refers to a carbon black pigment that has a structure in which at least hydrophilic group (e.g., acidic group) is bonded to the surface of the carbon black pigment either directly or via another atomic group, and can maintain a stably dispersed state without the addition of a surfactant or a polymer compound when suspended in water to prepare a dispersion, the dispersion of the carbon black pigment having a surface tension almost equal to that of water. The term "self-dispersible carbon black pigment" used herein also includes a self-dispersible carbon black pigment in which the hydrophilic group (e.g., acidic group) is neutralized with a counter ion.

Examples of the carbon black include furnace black, channel black, acetylene black, thermal black, and the like. These carbon blacks have a high carbon content, exhibit high blackness due to an amorphous structure, have a high drying rate as compared with peach black, lamp black, and the like, exhibit high storage stability, and are inexpensive.

A pigment aqueous dispersion produced using ultrafine carbon black (e.g., furnace black or channel black) exhibits high resolution and excellent print quality when used as an inkjet printer ink composition.

It is preferable to use carbon black having a specific surface area by nitrogen adsorption ($N_2SA$) of 50 m$^2$/g or more, more preferably 50 to 300 m$^2$/g, and still more preferably 80 to 250 m$^2$/g. It is preferable to use carbon black having a DBP absorption of 50 cm$^3$/100 g or more, more preferably 50 to 200 cm$^3$/100 g, and still more preferably 80 to 180 cm$^3$/100 g.

If the $N_2SA$ and the DBP absorption of the carbon black are within the above ranges, the resulting pigment aqueous dispersion exhibits excellent dispersibility in an aqueous medium and excellent ink performance when used as an inkjet ink composition.

Note that the term "specific surface area by nitrogen adsorption ($N_2SA$)" used herein refers to a value measured in accordance with "Carbon black for rubber industry—Fundamental characteristics—Part 2: Determination of specific surface area—Nitrogen adsorption methods—single-point procedures" specified in JIS K 6217-2, and the term "DBP absorption" used herein refers to a value measured in accordance with "Carbon black for rubber industry—Fundamental characteristics—Part 4: Determination of dibutylphthalate absorption number" specified in JIS K 6217-4.

The average particle size of the primary particles of the carbon black is preferably 10 to 70 nm, more preferably 15 to 43 nm, and still more preferably 18 to 30 nm. Note that the term "average particle size" of the primary particles of the carbon black used herein refers to the arithmetic mean value of the particle sizes of 2000 to 10,000 primary particles measured using an electron microscope having a resolution of 15 angstroms or more.

The volume average particle size of the carbon black is preferably 30 to 300 nm, more preferably 40 to 270 nm, and still more preferably 50 to 250 nm. The term "volume average particle size" of the carbon black used herein refers to the particle size at 50% (D50) in the cumulative volume particle size distribution measured by a laser diffraction particle size analyzer.

Specific examples of the carbon black include Tokablack #8500, Tokablack #8500F, Tokablack #7550SB, Tokablack #7550F (manufactured by Tokai Carbon Co., Ltd.); #650, #750, MA600, #44B, #44, #45B, MA7, MA11, #47, #45, #33, #45L, #47, #50, #52, MA77, MA8 (manufactured by Mitsubishi Chemical Corp.); FW200, FW2V, FWI, FW18PS, NIpex 180 IQ, FW1, Special Black 6, S160, S170 (manufactured by Degussa); Black Pearls 1000M, Black Pearls 800, Black Pearls 880, Monarch 1300, Monarch 700, Monarch 880, CRX 1444, Regal 330R, Regal 660R, Regal 660, Regal 415R, Regal 415, Black Pearls 4630, Monarch 4630 (manufactured by Cabot); Raven 7000, Raven 3500, Raven 5250, Raven 5750, Raven 5000 ULTRA II, HV 3396, Raven 1255, Raven 1250, Raven 1190, Raven 1000, Raven 1020, Raven 1035, Raven 1100 ULTRA, Raven 1170, Raven 1200 (manufactured by Columbian); DB1305 (manufactured by KOSCO); Sunblack 700, 705, 710, 715, 720, 725, 300, 305, 320, 325, X25, X45 (manufactured by Asahi Carbon Co., Ltd.); N220, N110, N234, N121 (manufactured by Sid Richardson); Niteron #300 (manufactured by Nippon Steel Chemical Carbon Co., Ltd.), Showblack N134, N110, N220, N234, N219 (manufactured by Cabot Japan K.K.); and the like.

The pigment (I) used to produce the polyurethane resin-bonded pigment according to one embodiment of the invention may be obtained by appropriately oxidizing the above pigment.

The pigment may be oxidized by a known method (e.g., liquid-phase oxidation or gas-phase oxidation).

The pigment may be subjected to liquid-phase oxidation using an oxidizing agent (e.g., hydrogen peroxide solution, nitric acid, sulfuric acid, chlorate, persulfate, or percarbonate). For example, the pigment (e.g., carbon black) may be added to an aqueous solution that contains the oxidizing agent, and the mixture may be stirred to obtain a pigment having a surface acidic group. An acidic group can be uniformly introduced into the surface of the pigment (e.g., carbon black) by controlling the amount of the oxidizing agent and the reaction temperature.

The pigment may be subjected to gas-phase oxidation using ozone oxidation or air oxidation. Gas-phase oxidation has advantages in that the drying cost is unnecessary, and the operation is easy as compared with liquid-phase oxidation, for example.

The acidic group introduced into the surface of the pigment by oxidation is not particularly limited as long as the acidic group can undergo an acid-base reaction with a basic compound having an amino group to form a salt. Examples of the acidic group include a carboxyl group, a sulfone group, and the like. The amount (number) of the acidic groups introduced into the surface of the pigment may be controlled by controlling the gas-phase oxidation conditions or the liquid-phase oxidation conditions.

An example in which oxidized carbon black (i.e., a black pigment having a surface acidic group) is produced by liquid-phase oxidation is described below.

Carbon black, the oxidizing agent, and the aqueous medium (preferably deionized water) are mixed in a stirring tank in an appropriate quantitative ratio. The mixture is sufficiently stirred in the stirring tank at an appropriate temperature (e.g., room temperature to 90° C., and preferably 60 to 90° C.) so that the carbon black is oxidized to obtain an aqueous dispersion (slurry) of a surface-oxidized pigment (i.e., a carbon black aggregate (agglomerate) on which a hydrophilic functional group (e.g., carboxyl group or hydroxyl group) is formed).

The carbon black can be efficiently dispersed in the slurry, and an acidic group can be uniformly and effectively produced by subjecting the carbon black to wet or dry oxidation in advance. When using wet oxidation, it is preferable to oxidize the carbon black using ozone water, a hydrogen peroxide solution, a peroxo diacid, or a salt thereof. When using dry oxidation, it is preferable to oxidize the carbon black by exposing the carbon black to a gas such as ozone, oxygen, $NO_X$, or $SO_X$.

It is also preferable to use (add) a surfactant so that the surface-oxidized pigment is uniformly dispersed in the slurry. An anionic surfactant, a nonionic surfactant, or a cationic surfactant may be used as the surfactant. Examples of the anionic surfactant include fatty acid salts, alkylsulfuric acid salts, alkylarylsulfonic acid salts, and the like. Examples of the nonionic surfactant include polyoxyethylene alkyl ethers, polyoxyethylene alkyl aryl ethers, and the like. Examples of the cationic surfactant include alkylamine salts, quaternary ammonium salts, and the like.

The slurry of the surface-oxidized pigment thus obtained may be reacted directly with the basic compound, or the surface-oxidized pigment may be subjected to partial neutralization (i.e., a treatment that neutralizes some of the acidic groups (surface functional groups)) in order to suppress aggregation of the surface-oxidized pigment or an increase in viscosity.

When subjecting the surface-oxidized pigment to partial neutralization, it is preferable to remove reduced salts (i.e., a reduced product of the oxidizing agent) produced by oxidation in advance. The subsequent neutralization reaction proceeds efficiently as a result of removing reduced salts, so that re-aggregation of the surface-oxidized pigment can be suppressed due to improved dispersibility in water. It is preferable to remove the reduced salts using a separation membrane such as an ultrafiltration (UF) membrane, a reverse osmosis (RO) membrane, or an electrodialysis membrane.

It is preferable to subject the surface-oxidized pigment to partial neutralization by adding a neutralizer to the slurry, and heating the mixture. Examples of the neutralizer include, but are not limited to, alkali salts such as potassium hydroxide and sodium hydroxide, ammonia, and organic amines such as ethanolamine, triethanolamine, dimethylaminoethanol, and quaternary amines. The amount of the neutralizer added to the slurry is adjusted depending on the amount (number) of surface functional groups introduced into the pigment, but is preferably 50 to 100 mol % based on the amount of surface (acidic) functional groups. The pigment may be neutralized at room temperature. It is preferable to add the neutralizer to the slurry of the pigment contained in a stirring tank, and stir the mixture at 40 to 100° C. for 1 to 16 hours.

It is preferable to remove undispersed aggregates and large particles present in the slurry of the pigment by centrifugation, filtration, or the like. The particle size distribution of the resulting pigment aqueous dispersion can be controlled by removing undispersed aggregates and large particles. This makes it possible to suppress clogging of a nozzle during printing when using the pigment aqueous dispersion as an inkjet printer ink composition.

When subjecting the pigment (slurry) to neutralization, it is preferable to remove salts (i.e., an oxide of the neutralizer) produced by neutralization. The dispersibility of the pigment in water can be improved by removing salts, so that re-aggregation of the surface-oxidized pigment can be suppressed. It is preferable to remove the salts using a separation membrane such as an ultrafiltration (UF) membrane, a reverse osmosis (RO) membrane, or an electrodialysis membrane.

When a self-dispersible pigment (i.e., pigment (I)) is neutralized with a counter ion, the pigment particles are normally dispersed due to repulsion of the ions, and the storage stability can normally be improved when a polymer is added to the surface of the pigment. However, the dispersion stability deteriorates when the surface of the pigment has a low acidic group concentration. In contrast, since the polyurethane resin-bonded pigment according to one embodiment of the invention is produced by bringing the pigment (I) into contact with the water-dispersible polyurethane resin (II) having a tertiary amino group and an anionic polar group or a nonionic polar chain, the polyurethane resin-bonded pigment exhibits excellent dispersibility and dispersion stability due to ionic attractive force and the like, even if the surface of the pigment (I) has a low acidic group concentration.

When using carbon black having a surface acidic group as the pigment (I), it is preferable to use carbon black having a carboxyl group equivalent of 200 to 1200 μmol/g, more preferably 400 to 1000 μmol/g, and still more preferably 600 to 800 μmol/g.

The concentration of the pigment (I) in the slurry is preferably 3 to 30 mass %, more preferably 4 to 28 mass %, and still more preferably 5 to 25 mass %. If the concentration of the pigment having a surface acidic group in the slurry is within the above range, the pigment can easily be reacted with a basic compound (II) having two or more amino groups selected from a primary amino group and a secondary amino group in the molecule by adding a given amount of the basic compound (II) to the shiny.

The pigment (I) having a surface acidic group can be obtained by the above method. Note that a commercially available product such as carbon black that exhibits relatively high dispersion stability (e.g., Aqua-Black (registered trademark) 162 or Aqua-Black (registered trademark) 164 (self-dispersible carbon black manufactured by Tokai Carbon Co., Ltd.)), or carbon black of which the surface has an acidic group concentration equal to or more than 50% and less than 100% of that of the self-dispersible carbon black, may also be used as the pigment having a surface acidic group.

The volume average particle size of the carbon black dispersed in water is preferably 30 to 300 nm, more preferably 40 to 270 nm, and still more preferably 50 to 250 nm. Note that the term "volume average particle size" of the carbon black used herein refers to the particle size at 50% (D50) in the cumulative volume particle size distribution measured by a laser diffraction particle size analyzer.

The polyurethane resin-bonded pigment according to one embodiment of the invention is produced by bringing the pigment (I) having a surface acidic group into contact with the water-dispersible polyurethane resin (II) having a tertiary amino group and an anionic polar group or a nonionic polar chain in the aqueous medium.

Examples of the anionic polar group that may be included in the water-dispersible polyurethane resin (II) include a carboxyl group and the like. Examples of the nonionic polar chain that may be included in the water-dispersible polyurethane resin (II) include a polyoxyethylene ether chain, a polyoxyalkylene ether chain that includes a polyoxyethylene ether chain, and the like.

The water-dispersible polyurethane resin (II) having a tertiary amino group and an anionic polar group or a nonionic polar chain may be obtained by reacting (II-a) a polyisocyanate polyurethane resin having an isocyanate end group with (II-b) an alkanolamine, the polyisocyanate polyurethane resin (II-a) being a resin in which a polyol compound having an anionic polar group or a nonionic polar chain that can be dispersed in the aqueous medium and having two or more hydroxyl groups in the molecule, is bonded to a polyisocyanate in an excess molar amount with respect to the polyol compound via a urethane bond.

The polyol compound having an anionic polar group or a nonionic polar chain that can be dispersed in the aqueous medium and having two or more hydroxyl groups in the molecule is preferably a compound having a functional group that can form a salt that causes phase inversion of the water-dispersible polyurethane resin (II) into the aqueous medium. Specific examples of such a compound include tertiary carboxyl group-containing polyol compounds.

Examples of the tertiary carboxyl group-containing polyol compounds include polyhydroxycarboxylic acids such as dimethylolpropionic acid, dimethylolbutanoic acid, dimethylolacetic acid, dimethylolbutyric acid, dimethylolvaleric acid, and dimethylolcaproic acid. Among these, dihydroxymonocarboxylic acids such as dimethylolpropionic acid and dimethylolbutanoic acid are preferable. Since the tertiary carboxyl group included in the above compounds has very low reactivity with an isocyanate compound, a urethane bond-forming reaction is not hindered, so that the target polyurethane resin can be efficiently produced.

The acid number of the resulting water-dispersible polyurethane resin (II) can be controlled by controlling the amount of the tertiary carboxyl group-containing polyol compound. The acid number of the water-dispersible polyurethane resin (II) may be controlled using a diol compound having a nonionic molecular chain in addition to the tertiary carboxyl group-containing polyol compound. Examples of the diol compound having a nonionic molecular chain include polyalkylene glycol diols such as polyethylene glycol (PEG) diol, and a copolymer diol of polyethylene glycol (PEG) diol and polypropylene glycol (PPG) diol or polybutylene glycol (PBG) diol.

A polyol having at least two hydroxyl groups in the molecule may be used together with the tertiary carboxyl group-containing polyol compound and the diol compound having a nonionic molecular chain in an arbitrary ratio.

Examples of the polyol having at least two hydroxyl groups in the molecule include a side chain-modified diol that has been chemically modified depending on the application via the Michael addition reaction or the like. The balance between the hydrophilicity and the hydrophobicity of the resulting polyurethane resin can be designed in various ways by introducing a hydrophobic group or a hydrophilic group into the side chain of the diol (polyol).

The side chain-modified diol may be synthesized by subjecting a dialkanolamine and a (meth)acrylic acid derivative to an addition reaction. The Michael addition reaction or the like can be easily controlled when using an acrylic acid derivative that reacts with the dialkanolamine at a low temperature (i.e., exhibits high reactivity) as compared with a methacrylic acid derivative. Examples of the dialkanolamine include dihydroxyalkyl-substituted derivatives of a secondary amine such as diethanolamine, dipropanolamine, and diisopropanolamine. Examples of the (meth)acrylic acid derivative include, but are not limited to, alkyl (meth)acrylates, cycloalkyl (meth)acrylates, aromatic (meth)acrylates, halogenated alkyl (meth)acrylates, (meth)acrylates, aromatic vinyl compounds, vinyl cyanide compounds, unsaturated dibasic acids, and derivatives thereof.

Examples of the alkyl (meth)acrylates include methyl (meth)acrylate, ethyl (meth)acrylate, butyl (meth)acrylate, 2-ethylhexyl (meth)acrylate, and the like.

Examples of the cycloalkyl (meth)acrylates include cyclohexyl (meth)acrylate, methylcyclohexyl (meth)acrylate, bornyl (meth)acrylate, isobornyl (meth)acrylate, adamantyl (meth)acrylate, and the like.

Examples of the aromatic (meth)acrylates include phenyl (meth)acrylate, benzyl (meth)acrylate, and the like.

Examples of the halogenated alkyl (meth)acrylates include fluoromethyl (meth)acrylate, fluoroethyl (meth)acrylate, and the like.

Examples of the (meth)acrylates include hydroxyalkyl (meth)acrylates, glycidyl (meth)acrylate, ethylene glycol (meth)acrylate, polyethylene glycol (meth)acrylate, and the like.

Examples of the aromatic vinyl compounds include styrene, α-substituted styrenes such as α-methylstyrene and α-ethylstyrene, nucleus-substituted styrenes such as fluorostyrene and methylstyrene, and the like.

Examples of the (meth)acrylic acid derivatives include aliphatic monoacrylates such as 2-ethylhexyl (meth)acrylate, lauryl (meth)acrylate, and stearyl (meth)acrylate; alicyclic mono acrylates such as cyclohexyl (meth)acrylate, dicyclopentanyl (metha)acrylate, and isobornyl (meth)acrylate; aromatic monoacrylates such as benzyl (meth)acrylate, phenyl (meth)acrylate, phenoxyethyl (meth)acrylate, phenoxy diethylene glycol (meth)acrylate, phenoxy tetraethylene glycol (meth)acrylate, nonylphenoxyethyl (meth)acrylate, and nonylphenoxy tetraethylene glycol (meth)acrylate; alkyl ether acrylates such as methoxy diethylene glycol (meth)acrylate, ethoxy diethylene glycol (meth)acrylate, butoxyethyl (meth) acrylate, butoxy triethylene glycol (meth)acrylate, and methoxy dipropylene glycol (meth)acrylate; mono(meth)acryloyloxy dibasic acid esters such as 2-(meth)acryloyloxyethyl hydrogen succinate, 2-(meth)acryloyloxyethyl hydrogen hexahydrophthalate, 2-(meth)acryloyloxyethyl hydrogen phthalate, and 2-(meth)acryloyloxypropyl hydrogen phthalate; monoalkyl ether polyoxyalkylene glycol (meth)acrylates such as mono(2-ethylhexyl)ether polyoxyethylene glycol (meth)acrylate, mono(nonylphenyl) ether polyoxyethylene glycol (meth)acrylate, mono(2-ethylhexyl) ether polyoxypropylene glycol (meth)acrylate, and mono(n-onylphenyl)ether polyoxypropylene glycol (meth)acrylate; monoacrylates including a polyoxyethylene ether bond, such as polyethylene glycol mono(meth)acrylate and polypropylene glycol mono(meth)acrylate; hydroxyl group-containing mono(meth)acrylates such as 2-hydroxyethyl (meth)acrylate, 2-hydroxypropyl (meth)acrylate, glycerol mono (meth)acrylate, 2-hydroxy-3-butoxypropyl (meth)acrylate, 2-hydroxy-3-phenoxypropyl (meth)acrylate, and an s-caprolactone adduct of 2-hydroxyethyl (meth)acrylate; alicyclic ether (meth)acrylates such as glycidyl (meth)acrylate and tetrahydrofurfuryl (meth)acrylate; nitrogen-containing monoacrylates such as N,N-dimethylaminoethyl (meth)acrylate, N,N-diethylaminoethyl (meth)acrylate, morpholino (meth) acrylate, N,N-dimethylacrylamide, dimethylaminopropyl acrylate, and N-isopropylacrylamide; polyoxyalkylene phosphate mono(meth)acrylates such as polyoxyethylene phosphate mono(meth)acrylate and polyoxypropylene phosphate mono(meth)acrylate; and the like.

It is preferable to use an acrylic acid derivative as compared with a methacrylic acid derivative as the raw material that is subjected to the Michael addition reaction for obtaining the side chain-modified diol since an acrylic acid derivative has high reactivity with an amine at a low reaction temperature.

Examples of the polyol having at least two hydroxyl groups in the molecule include dials such as ethylene glycol, propylene glycol, cyclohexane-1,4-dimethanol, 1,3-butylene glycol, tetramethylene glycol, neopentyl glycol, 1,6-hexanediol, 3-methyl-1,5-pentanediol, 2-ethyl-1,3-hexanediol, 2-butyl-2-ethyl-1,3-propanediol, 2-methyl-1,8-octanediol, 1,9-nonanediol, and cyclohexyldimethanol, and high-molecular-weight polyols.

Examples of the high-molecular-weight polyols include polyester polyols such as a polyester diol, high-molecular-weight diols such as a polycarbonatediol, a polylactonediol, and a polybutadienediol, polyether polyols, and the like. Further examples of the high-molecular-weight polyols include polymer diols of a compound that includes a rosin skeleton or a hydrogenated rosin skeleton. It is preferable to use a high-molecular-weight polyol having a number average molecular weight of 300 to 5000, and more preferably 500 to 3000.

Examples of the polyester polyols include a polyester polyol obtained by condensation of one or two or more of a polyol and a polyol generic component and one or two or more of a polybasic acid and an anhydride thereof.

Examples of the polyol used as the raw material for producing the polyester polyol include ethylene glycol, propylene glycol, cyclohexane-1,4-dimethanol, 1,3-butylene glycol, tetramethylene glycol, neopentyl glycol, 1,6-hexanediol, 3-methyl-1,5-pentanediol, 2-ethyl-1,3-hexanediol, 2-butyl-2-ethyl-1,3-propanediol, 2-methyl-1,8-octanediol, 1,9-nonanediol, cyclohexyldimethanol, bisphenol A, bisphenol F, hydrogenated bisphenol A, hydrogenated bisphenol F, a castor oil-modified diol, a castor oil-modified polyol, and the like.

Examples of the polyol generic component used as the raw material for producing the polyester polyol include alkyl monoglycidyl ethers such as butyl glycidyl ether, 2-ethylhexyl glycidyl ether, lauryl glycidyl ether, decyl glycidyl ether, and stearyl glycidyl ether, and monoepoxy compounds such as an alkyl glycidyl ester ("Cardura E10" manufactured by Shell Japan).

Examples of the polybasic acid and an anhydride thereof used as the raw material for producing the polyester polyol include aliphatic dibasic acids such as succinic acid, adipic acid, azelaic acid, sebacic acid, and a dinner acid, anhydrides thereof, aromatic polybasic acids and anhydrides thereof such as dodecenylsuccinic anhydride, phthalic anhydride, isophthalic acid, terephthalic acid, and trimellitic anhydride, alicyclic polybasic acids and anhydrides thereof such as hydrophthalic anhydride and dimethyl-1,4-cyclohexanedicarboxylic acid, and the like.

Examples of a polylactonediol include a polylactonediol obtained by ring-opening addition polymerization of a hydroxyl-terminated compound (e.g., polyol or polyester polyol) and a monomer that includes a lactone ring (e.g., ε-caprolactone or β-methyl-δ-valerolactone).

Examples of a polycarbonatediol include a polycarbonatediol obtained using a diol such as 1,4-butanediol, 1,6-hexanediol, 3-methyl-1,5-pentanediol, 2-ethyl-1,3-hexanediol, 2-butyl-2-ethyl-1,3-propanediol, 1,9-nonanediol, or 2-methyl-1,8-octanediol as a raw material.

Examples of the polybutadienediol include a polybutadienediol shown by the following formula ("Poly bd R-15HT" and "Poly bd R-45HT" manufactured by Idemitsu Kosan Co., Ltd.),

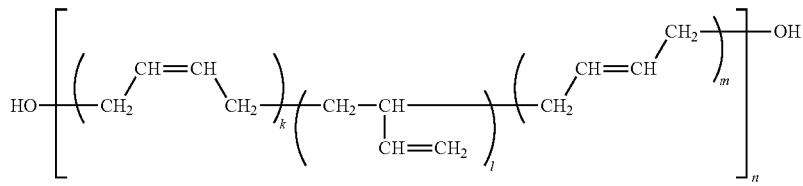

wherein k=0.2, l=0.2, m=0.6, and n is a positive integer, a polyisoprenediol ("Poly ip" manufactured by Idemitsu Kosan Co., Ltd.), an α,ω-polybutadiene glycol shown by the following formula ("G-1000", "G-2000", and "G-3000" manufactured by Nippon Soda Co., Ltd.),

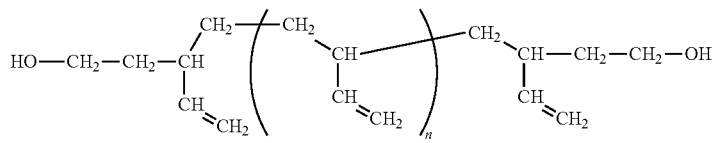

wherein n is a positive integer, and the like.

Examples of the polyether polyol include a polyether polyol obtained by adding propylene oxide, tetrahydrofuran, or butylene oxide to a polyalkylene glycol (e.g., polyethylene glycol (PEG) diol, polypropylene glycol (PPG) diol, or polybutylene glycol (PBG) diol), bisphenol A, bisphenol F, hydrogenated bisphenol A, hydrogenated bisphenol F, or the like.

Examples of the polymer diols of a compound that includes a rosin skeleton or a hydrogenated rosin skeleton include Pine Crystal D-6011 and Pine Crystal D-6240 (manufactured by Arakawa Chemical Industries, Ltd.).

The polyisocyanate compound is not particularly limited as long as the polyisocyanate compound includes two or more isocyanate groups in the molecule. A diisocyanate compound or a polyisocyanate compound that includes three or more isocyanate groups may be used depending on the application.

Examples of the diisocyanate compound include diphenylmethane diisocyanate (hereinafter may be referred to as "MDI"), a polyphenylenepolymethylene polyisocyanate, tolylene diisocyanate (hereinafter may be referred to as "TDI"), xylylene diisocyanate, tetramethylxylylene diisocyanate, isophorone diisocyanate (hereinafter may be referred to as "IPDI"), hexamethylene diisocyanate (hereinafter may be referred to as "HDI"), tetramethylene diisocyanate, dodecamethylene diisocyanate, trimethylhexamethylene diisocyanate, 1,3-cyclohexylene diisocyanate, naphthalene diisocyanate, hydrogenated diphenylmethane diisocyanate (hereinafter may be referred to as "hydrogenated MDI"), hydrogenated xylylene diisocyanate, 1,3-bis(isocyanatomethyl)cyclohexane (hydrogenated XDI), a compound obtained by substituting some of the isocyanate groups of such an isocyanate group-containing compound with a biuret group, an allophanate group, a carbodiimide group, a uretonimine group, an oxazolidone group, an amide group, an imide group, an isocyanurate group, or a urethodione group, and the like. These compounds may be used either alone or in combination.

Among these diisocyanate compounds, it is preferable to use a nonaromatic diisocyanate compound that shows a low rate of reaction with water as compared with an aromatic diisocyanate compound. It is desirable that the isocyanate end group of the polyisocyanate polyurethane resin (II-a) be derived from an alicyclic or aliphatic diisocyanate that relatively slowly reacts with water. An aromatic diisocyanate compound can be introduced into the molecule when the isocyanate end group is derived from an alicyclic or aliphatic diisocyanate.

The polyisocyanate polyurethane resin (II-a) having such an isocyanate end group may be produced by reacting an aromatic diisocyanate with an excess (molar ratio) dial, and reacting the resulting product with an alicyclic or aliphatic diisocyanate, for example. Since an aromatic diisocyanate has high reactivity with a diol as compared with an alicyclic or aliphatic diisocyanate, an isocyanate end group derived from an alicyclic or aliphatic diisocyanate can be formed by controlling the reaction temperature and the like by utilizing the difference in reactivity.

When producing the polyisocyanate polyurethane resin (II-a) having an isocyanate end group by bonding a polyol compound having at least two hydroxyl group in the molecule and a diisocyanate compound via a urethane bond, a polyurethane resin having an isocyanate group on each end can be obtained by reacting the compounds so that the number of equivalents of the isocyanate groups of the diisocyanate compound is greater than the number of equivalents of the hydroxyl groups of the compound having at least two hydroxyl group in the molecule by two. For example, when using a diol compound as the compound having at least two hydroxyl group in the molecule, the number of moles of the diisocyanate compound is set to be larger than that of the diol compound by 1 mol. A polymer having an isocyanate end group may be accurately obtained (i.e., a polyurethane resin that exhibits a small variation in molecular weight distribution may be obtained) by synthesizing an isocyanate-terminated oligomer stepwise (i.e., increasing the molecular weight stepwise).

When producing the polyurethane resin by reacting a compound having two hydroxyl groups in the molecule with a diisocyanate compound, a polyurethane having an isocyanate end group may be synthesized by reacting the diol compound and the diisocyanate compound in an organic solvent so that the total number of moles of the diisocyanate compound is "n+1" when the total number of moles of the diol compound is referred to as "n".

It is preferable that the polyisocyanate polyurethane resin (II-a) having an isocyanate end group have an acid number of 20 to 200 mg KOH/g so that the polyisocyanate polyurethane resin (II-a) can be dispersed in water. The acid number of the polyisocyanate polyurethane resin (II-a) is more preferably 25 to 150 mg KOH/g, and still more preferably 30 to 120 mg KOH/g.

The acid number may be adjusted by adjusting the number of moles of the tertiary carboxyl group-containing dial compound.

When using a tertiary carboxyl group-containing diol compound as the compound having an anionic polar group or a nonionic polar chain that can be dispersed in the aqueous medium and having two or more hydroxyl groups in the molecule, and using a diisocyanate compound as the polyisocyanate compound, the acid number (AN) of the polyisocyanate polyurethane resin (II-a) having an isocyanate end group is calculated by the following expression.

$$AN = \frac{a1 \cdot 56.11 \cdot 10^3}{\sum_{n=1}^{n} an \cdot An + \sum_{n=1}^{n} bn \cdot Bn}$$

where, a1 is the number of moles of the tertiary carboxyl group-containing diol compound (e.g., dimethylolpropionic acid), A1 is the molecular weight of the tertiary carboxyl group-containing diol compound (e.g., dimethylolpropionic acid), an is the number of moles of another diol, An is the molecular weight of the other diol, bn is the number of moles of the diisocyanate compound, and Bn is the molecular weight of the diisocyanate compound.

When using a diol compound as the polyol, and using a diisocyanate compound as the polyisocyanate compound, the number average molecular weight of the polyisocyanate polyurethane resin (II-a) is calculated (adjusted) by the following expression.

Number average molecular weight=$nA'+(n+1)B'$ where, n is the total number of moles of the polyol, A' is the number average molecular weight of the polyol, and B' is the number average molecular weight of the diisocyanate compound.

The number average molecular weight of the polyisocyanate polyurethane resin (II-a) is preferably 1000 to 15,000, more preferably 1300 to 10,000, and still more preferably 1600 to 8000. The acid number of the polyisocyanate polyurethane resin (II-a) is preferably 20 to 120 mg KOH/g, more preferably 30 to 110 mg KOH/g, and still more preferably 35 to 100 mg KOH/g.

When producing the polyurethane resin using a trifunctional or higher functional polyol and the polyisocyanate compound, it is desirable to prevent gelation by adjusting the molar fraction in accordance with Flory's equation or the like.

When producing the polyisocyanate polyurethane resin (II-a) having an isocyanate end group, the polyol and the polyisocyanate compound are preferably reacted at 60 to 80° C. in order to suppress side reactions. The polyol and the polyisocyanate compound may be reacted without using a solvent, or may be reacted using an arbitrary organic solvent (e.g., ethyl acetate, methyl ethyl ketone, or acetonitrile) that is normally used for a urethane reaction. An arbitrary urethane reaction catalyst such as a tertiary amine-based catalyst, dibutyltin laurate, or tin(II) octylate may be used when reacting the polyol and the polyisocyanate compound. Note that the urethane reaction catalyst need not necessarily be used.

When producing the polyisocyanate polyurethane resin (II-a) having an isocyanate end group using a tertiary carboxyl group-containing polyol compound or the like, it is preferable to appropriately add a tertiary amine such as triethylamine, trimethylamine, N-methylmorpholine, tributylamine, N-methylpyrazine, or methylidazole during phase inversion of the polyurethane resin into the aqueous medium.

It is preferable that the polyisocyanate polyurethane resin (II-a) having an isocyanate end group have an anionic polar group or a nonionic polar chain in the molecular chain. When the polyisocyanate polyurethane resin (II-a) has an anionic polar group, it is preferable to neutralize the polyisocyanate polyurethane resin (II-a) with a counter ion before dispersing the polyisocyanate polyurethane resin (II-a) in water.

The water-dispersible polyurethane resin (II) having a tertiary amino group and an anionic polar group or a nonionic polar chain may be obtained by reacting the polyisocyanate polyurethane resin (II-a) having an isocyanate end group with the alkanolamine (II-b).

Examples of the alkanolamine (II-b) include N,N'-dialkylalkanolamines, N-monoalkyldialkanolamines, and the like.

Examples of the N,N'-dialkylalkanolamines include dimethylethanolamine and the like.

Examples of the N-monoalkyldialkanolamines include N-methyldiethanolamine and the like.

A water-dispersible polyurethane resin (II) having a side-chain or end amino group can be obtained by utilizing an alkanolamine having two or more hydroxyl groups in the molecule (e.g., N-monoalkyldialkanolamine) as the alkanolamine (II-b).

When reacting the polyisocyanate polyurethane resin (II-a) and the alkanolamine (II-b), it is preferable to react the polyisocyanate polyurethane resin (II-a) and the alkanolamine (II-b) so that 0.90 to 1.10 mol (preferably 0.95 to 1.06 mol, and still more preferably 0.98 to 1.03 mol) of the hydroxyl groups (OH) of the alkanolamine (II-b) react with 1 mol of the isocyanate groups (NCO) of the polyisocyanate polyurethane resin (II-a) (on a solid content basis).

The polyisocyanate polyurethane resin (II-a) and the alkanolamine (II-b) may be reacted in a known organic solvent. It is preferable to react the polyisocyanate polyurethane resin (II-a) and the alkanolamine (II-b) at 45 to 75° C. so that the NCO group reaction rate is 95 to 100%.

The term "NCO group reaction rate" used herein refers to a value measured in accordance with JIS K 7301 6.3 (isocyanate group content).

For example, the NCO group reaction rate is calculated by calculating the isocyanate group content (NCO %) before reaction from the total weight of the polyisocyanate polyurethane resin (II-a) and the alkanolamine (II-b) and the equivalent of isocyanate groups (NCO groups), and calculating the theoretical isocyanate group content (NCO %) when all of the isocyanate groups have reacted.

It is preferable that the water-dispersible polyurethane resin (II) have a number average molecular weight determined by end-group analysis (i.e., an amino group is titrated using hydrochloric acid) of 1000 to 15,000, more preferably 1300 to 10,000, and still more preferably 1600 to 8000.

It is preferable that the water-dispersible polyurethane resin (II) have an acid number of 20 to 200 mg KOH/g, more preferably 25 to 150 mg KOH/g, and still more preferably 30 to 120 mg KOH/g, so that the water-dispersible polyurethane resin (II) can be dispersed in water.

The polyurethane resin-bonded pigment according to one embodiment of the invention is produced by bringing the pigment (I) having a surface acidic group into contact with the water-dispersible polyurethane resin (II) in the aqueous medium.

The aqueous medium is preferably water. When using an aqueous medium other than water, it is preferable to use a solvent that is water-soluble and does not react with an amine and an isocyanate (e.g., ethers such as acetonitrile, tetrahydrofuran, ethylene glycol dimethyl ether, or diethylene glycol dimethyl ether). For example, a glycol aqueous solvent (e.g., ethylene glycol, propylene glycol, butylene glycol, diethylene glycol, triethylene glycol, or polyethylene glycol), dimethyl sulfoxide, sulfolane, or the like may be used. These aqueous media may be used in combination.

The polyurethane resin-bonded pigment according to one embodiment of the invention is preferably produced by bringing the pigment (I) having a surface acidic group into contact with the water-dispersible polyurethane resin (II) in the aqueous medium at 20 to 60° C. (more preferably at room temperature). It is preferable to bring the pigment (I) into contact with the water-dispersible polyurethane resin (II) for 0.25 to 1 hour with stirring.

It is preferable that the polyurethane resin-bonded pigment according to one embodiment of the invention include 3 to 200 parts by mass (more preferably 7 to 100 parts by mass) of the water-dispersible polyurethane resin (II) based on 100 parts by mass of the pigment (I) having a surface acidic group (on a solid content basis).

If the amount of the water-dispersible polyurethane resin (II) is less than 3 parts by mass based on 100 parts by mass of the pigment (I) having a surface acidic group, it may be difficult to improve the dispersion stability, image density, and rubfastness. Moreover, an increase in viscosity of the solution may occur. If the amount of the water-dispersible polyurethane resin (II) exceeds 200 parts by mass based on 100 parts by mass of the pigment (I) having a surface acidic group, a decrease in image density may occur due to a decrease in weight fraction of the pigment (I).

Since the polyurethane resin-bonded pigment according to one embodiment of the invention is produced by bringing the pigment (I) having a surface acidic group into contact with the water-dispersible polyurethane resin (II) having a tertiary amino group and an anionic polar group or a nonionic polar chain in the aqueous medium, ionic attraction occurs between the surface acidic group of the pigment (I) and the surface functional group (tertiary amino group) of the water-dispersible polyurethane resin (II) so that the low-polarity main chain of the water-dispersible polyurethane resin (II) is physically adsorbed on the pigment (I), and the anionic polar group or nonionic polar chain of the water-dispersible polyurethane resin (II) exhibits affinity to the aqueous medium. Specifically, the water-dispersible resin (II) functions as a dispersing agent so that the pigment (I) is dispersed in the aqueous medium. Therefore, the polyurethane resin-bonded pigment exhibits improved dispersion stability, storage stability, and resolubility, ensures excellent image density, and forms an ink film (coating) that exhibits marker resistance and rubfastness.

A pigment dispersion composition according to one embodiment of the invention is described below.

The pigment dispersion composition according to one embodiment of the invention includes the polyurethane resin-bonded pigment according to one embodiment of the invention.

The pigment dispersion composition according to one embodiment of the invention may include an additive (e.g., moisturizer, preservative, emulsifier, pH-adjusting agent, anti-foaming agent, and smoothing agent), an aqueous wax dispersion, a resin emulsion, a water-dispersible resin, and the like in addition to the polyurethane resin-bonded pigment according to one embodiment of the invention.

The moisturizer may be one or more compounds selected from polyoxyalkylene ether glycols (e.g., glycerol, diethylene glycol, triethylene glycol, and dipropylene glycol), monoalkyl ethers and dialkyl ethers of polyoxyalkylene ether glycols, and the like.

Examples of the water-dispersible resin include water-dispersible polymer resins that exhibit self-emulsifiability and self-dispersibility (e.g., acrylic emulsion, latex, and waterborne resin), and water-dispersible polymer resins obtained by emulsifying or dispersing a monomer that form such a resin with an emulsifier to form particles, and effecting polymerization within the particles.

Further examples of the water-dispersible resin include resins that exhibit self-dispersibility and self-emulsifiability (e.g., epoxy ester resins, vinyl-modified epoxy resins, high-acid-number alkyd resins, vinyl-modified waterborne alkyd resins, waterborne polyester resins, and waterborne polyurethane resins), and core-shell resins obtained by forming particles using such a resin as an emulsifier, and polymerizing different monomers within the particles.

Examples of the water-dispersible polymer resins include water-dispersible polymer resins obtained by copolymerizing polymerizable vinyl monomers such as unsaturated group-containing acids (e.g., crotonic acid, itaconic acid, fumaric acid, and maleic acid), esters thereof, styrene, vinyl acetate, vinyl versatate, (meth)acrylic acid, (meth)acrylates, and sodium styrenesulfonate.

Examples of the emulsion-type water-dispersible polymer resins include emulsion-type water-dispersible polymer resins that include the above water-dispersible polymer resin and an emulsifier.

Examples of the epoxy ester resins include epoxy ester resins obtained by reacting an acid anhydride with an epoxy ester obtained by reacting a fatty acid having an unsaturated double bond with the epoxy group and the hydroxyl group of an epoxy resin to obtain a polymer having a carboxyl group in the molecule, and neutralizing the polymer with a counter ion.

Examples of the vinyl-modified epoxy resins include vinyl-modified epoxy resins obtained by reacting a fatty acid having an unsaturated double bond with the epoxy group and the hydroxyl group of an epoxy resin to obtain an epoxy ester resin, and reacting (copolymerizing) a polymerizable vinyl monomer with the unsaturated double bond of the fatty acid that forms the epoxy ester resin.

Examples of the high-acid-number alkyd resins include high-acid-number alkyd resins derived from condensation products of polycarboxylic acid compounds obtained by acidolysis of a polybasic acid and oils and fats with a monohydric alcohol, a diol, or a polyol.

Examples of the vinyl-modified waterborne alkyd resins include vinyl-modified waterborne alkyd resins obtained by condensing a compound obtained by alcoholysis of a polyhydric alcohol and oils and fats with a polybasic acid to obtain an alkyd resin, and reacting (copolymerizing) a polymerizable vinyl monomer (that may be used as the raw material for producing the water-dispersible polymer resins) with the unsaturated double bond of the fat-oil component that forms the alkyd resin.

Examples of the waterborne polyester resins include waterborne polyester resins obtained by reacting a dialkanolalkanoic acid (e.g., dimethylolpropionic acid or dimethylolbutanoic acid) having a hydroxyl group and a tertiary carboxyl group in the molecule with a dibasic acid as a diol component.

The waterborne polyester resins may be obtained by subjecting one or more compounds selected from polyoxyethylene ether glycol that introduces a hydrophilic group, tertiary carboxyl group-containing polyol compounds, polyols, and polyol generic components and one or more compounds selected from polybasic acids, anhydrides thereof, and the like to a condensation reaction. A polyester in which an acid is introduced into the molecular chain may be neutralized with a counter ion.

Examples of the tertiary carboxyl group-containing polyol compounds used as the raw material for producing the waterborne polyester resins include polyhydroxycarboxylic acids such as dimethylolpropionic acid, dimethylolbutanoic acid, dimethylolacetic acid, dimethylolbutyric acid, dimethylolvaleric acid, and dimethylolcaproic acid. Among these, dihydroxymonocarboxylic acids such as dimethylolpropionic acid and dimethylolbutanoic acid are preferable.

Examples of the polyol used as the raw material for producing the waterborne polyester include ethylene glycol, propylene glycol, cyclohexane-1,4-dimethanol, 1,3-butylene glycol, tetramethylene glycol, neopentyl glycol, 1,6-hexanediol, 3-methyl-1,5-pentanediol, 2-ethyl-1,3-hexanediol, 2-butyl-2-ethyl-1,3-propanediol, 2-methyl-1,8-octanediol, 1,9-nonanediol, cyclohexyldimethanol, bisphenol A, bisphenol F, hydrogenated bisphenol A, hydrogenated bisphenol F, a castor oil-modified diol, a castor oil-modified polyol, and the like.

Examples of the polyol generic component used as the raw material for producing the polyester include alkyl monoglycidyl ethers such as butyl glycidyl ether, 2-ethylhexyl glycidyl ether, lauryl glycidyl ether, decyl glycidyl ether, and stearyl glycidyl ether, and monoepoxy compounds such as an alkyl glycidyl ester ("Cardura E10" manufactured by Shell Japan).

Examples of the polybasic acids and anhydrides thereof used as the raw material for producing the waterborne polyester include aliphatic dibasic acids such as succinic acid, adipic acid, azelaic acid, sebacic acid, and a dimer acid, anhydrides thereof, aromatic polybasic acids and anhydrides thereof such as dodecenylsuccinic anhydride, phthalic anhydride, isophthalic acid, terephthalic acid, and trimellitic anhydride, alicyclic polybasic acids and anhydrides thereof such as hydrophthalic anhydride and dimethyl-1,4-cyclohexanedicarboxylic acid, and the like.

Examples of the emulsifier-dispersible water-dispersible resin that may be used as the water-dispersible resin (B) include emulsion-type water-dispersible polymer resins obtained by emulsifying or dispersing a resin monomer using an emulsifier to form particles, and effecting polymerization within the particles, core-shell emulsions obtained by polymerizing different monomers within particles using a self-dispersible and self-emulsifiable resin as an emulsifier.

The emulsifier is preferably one or more compounds selected from anionic emulsifiers and nonionic emulsifiers.

It is preferable to use a water-dispersible resin that is dispersed in an aqueous medium (e.g., water). Examples of the aqueous medium include those mentioned above.

The average particle size of the water-dispersible resin used for the pigment dispersion composition according to one embodiment of the invention is normally 10 to 300 nm, preferably 20 to 250 nm, and more preferably 30 to 200 nm.

Note that the term "volume average particle size" of the water-dispersible resin used herein refers to the 50% mode diameter (i.e., the particle size at 50% (D50) in the cumulative volume particle size distribution) measured by a dynamic light scattering particle size analyzer.

When the pigment dispersion composition according to one embodiment of the invention includes the water-dispersible resin in addition to the polyurethane resin-bonded pigment according to one embodiment of the invention, the resulting film (coating) exhibits improved rubfastness, marker resistance, and the like.

It is preferable that the pigment dispersion composition according to one embodiment of the invention include 3 to 200 mass % (more preferably 5 to 150 mass %, and still more preferably 7 to 100 mass %) of the water-dispersible resin (on a solid content basis).

The pigment dispersion composition according to one embodiment of the invention may be prepared by stirring the polyurethane resin-bonded pigment in a container optionally together with a water-dispersible resin, an additive (e.g., moisturizer, preservative, emulsifier, pH-adjusting agent, anti-foaming agent, and smoothing agent), an aqueous wax dispersion, a resin emulsion, or the like, optionally adjusting the viscosity of the polyurethane resin-bonded pigment (or mixture) using water or a water-soluble organic solvent, and filtering the polyurethane resin-bonded pigment (or mixture) by a known filtration method.

The pigment concentration (i.e., the mass ratio of the pigment (I)) in the pigment dispersion composition according to one embodiment of the invention may be appropriately determined depending on the type of the pigment and the application of the pigment dispersion composition. The pigment concentration is normally 2 to 30 mass %. When using the pigment dispersion composition as an inkjet ink composition utilizing a carbon black pigment, the pigment concentration may be 2 to 15 mass %.

The pigment dispersion composition according to one embodiment of the invention may exhibit excellent image density, dispersibility, storage stability, and resolubility, and may form an ink film that exhibits marker resistance and rubfastness.

An inkjet ink composition according to one embodiment of the invention is described below.

The inkjet ink composition according to one embodiment of the invention includes the pigment dispersion composition according to one embodiment of the invention.

The inkjet ink composition according to one embodiment of the invention is the same as the pigment dispersion composition according to one embodiment of the invention, except that the inkjet ink composition inkjet ink composition is used for inkjet ink applications. The above description also applies to the inkjet ink composition inkjet ink composition.

The inkjet ink composition according to one embodiment of the invention may exhibit excellent image density, dispersibility, storage stability, and resolubility, and may form an ink film (coating) that exhibits marker resistance and rubfastness.

EXAMPLES

The invention is further described below by way of examples and comparative examples. Note that the invention is not limited to the following examples.

A low-oxidized carbon black pigment α used as the pigment (I) having a surface acidic group, a water-dispersible polyurethane resin a used as the water-dispersible polyurethane resin (II), and a water-dispersible polyurethane resin b used as the water-dispersible polyurethane resin (II) were produced as described below.

Production of Low-Oxidized Carbon Black Pigment α

100 g of carbon black a (specific surface area by nitrogen adsorption: 170 $m^2/g$, DBP absorption: 115 $cm^3/100$ g) and sodium peroxodisulfate ($Na_2S_2O_8$) (that was weighed using the following expression (1) so that 0.10 mmol of sodium peroxodisulfate reacts with the carbon black per unit surface area ($m^2$) of the carbon black) were dissolved in purified water to obtain an aqueous solution (3 $dm^3$). The aqueous solution was added to a reaction vessel, and oxidized at 60° C. for 10 hours at a stirring speed of 0.12 $s^{-1}$.

The oxidized carbon black was filtered off, dispersed in purified water, and neutralized with a sodium hydroxide aqueous solution. The resulting carbon black slurry was centrifuged at $7.5 \times 10^{-3}$ $s^{-1}$ for 15 minutes using a centrifuge ("CR22F" manufactured by Hitachi-Koki Co., Ltd.). The remaining salts were separated from the supernatant liquid using an ultrafiltration membrane ("AHP-1010" manufactured by Asahi Kasei Corporation, molecular weight cut-off: 50,000), and water was removed so that the carbon black concentration was 20 mass % to obtain a water dispersion of the low-oxidized carbon black pigment α.

Necessary amount of sodium peroxodisulfate(mg)=
(number of moles(mmol/$m^2$) of sodium peroxodisulfate per unit area of carbon black)×(specific surface area($m^2$/g) of carbon black)×(amount(g) of carbon black)×(equivalent(238.1 g/mol) of sodium peroxodisulfate) (1)

For example, the mass of sodium peroxodisulfate required to treat 100 g of the carbon black a is calculated to be 0.10 (mmol/$m^2$)×170 ($m^2$/g)×100 (g)×238.1 (g/mol)=404,770 (mg)=404.77 (g).

Synthesis of Water-Dispersible Polyurethane Resin a
(1) Synthesis of Side Chain-Modified Diol A flask equipped with a stirring rod, a dry nitrogen gas supply tube, and an Allihn condenser was charged with 190 parts by mass of N,N'-diethanolamine and 810 parts by mass of Light Acrylate NP-4EA (nonyl phenyl tetraethylene ether glycol acrylate) (manufactured by Kyoeisha Chemical Co., Ltd.). The mixture was reacted at 80° C. for 7 hours to obtain a diol LKG-1 having a nonylphenyl group in the molecular chain.

The ratio (tertiary amine number/total amine number) of the tertiary amine number to the total amine number in the resulting reaction product was 0.98 or more.

(2) Synthesis of Water-Dispersible Polyurethane Resin

A flask equipped with a stirring rod, a nitrogen supply tube, and an Allihn condenser was charged with 100 parts by mass of methyl ethyl ketone (MEK), 59.4 parts by mass (2.9 mol) of dimethylolpropionic acid, 59.4 parts by mass (0.7 mol) of the diol LKG-1 obtained in "(1) Synthesis of side chain-modified diol", 106 parts by mass (0.7 mol) of a polyester diol ("P-1050" manufactured by Kuraray Ltd., number average molecular mass: 994), 107 parts by mass (0.7 mol) of a polyethylene ether glycol ("#1000" manufactured by NOF Corporation, number average molecular weight 1002), and 240 parts by mass (6 mol) of isophorone diisocyanate ("Desmodule I" manufactured by Sumika Bayer Urethane Co., Ltd.). The mixture was reacted at 65° C. for 6 hours. The isocyanate group concentration in the reaction mixture was 1.55 mass %.

After the addition of 27.5 parts by mass (2.02 mol) of N,N'-dimethylaminomethanol and 200 parts by mass of methyl ethyl ketone, the mixture was reacted at 70° C. for 2 hour. The acid number of the reaction product (solid content) was 37.4 mg KOH/g.

The mixture was then cooled to 35° C. After the addition of 45 parts by mass of N-methylmorpholine, the mixture was stirred for 30 minutes to obtain the water-dispersible polyurethane resin a having a tertiary amino end group and a nonionic polar chain.

The resulting water-dispersible polyurethane resin 1 had a nonvolatile content of 58.0 mass %, a Gardner bubble viscosity of Z to Z1, a GPC number average molecular weight of 2813, a mass average molecular weight of 9238, and a ratio of the number of moles of OH groups to the number of moles of NCO groups (number of moles of OH groups/number of moles of NCO groups) of 5/6.

Synthesis of Water-Dispersible Polyurethane Resin b

A flask equipped with a stirring rod, a dry nitrogen gas supply tube, and an Allihn condenser was charged with 200 parts by mass of methyl ethyl ketone (MEK), 55.5 parts by mass (2.9 mol) of dimethylolpropionic acid, and 225 parts by mass (6 mol) of hydrogenated MDI ("Desmodule W" manufactured by Sumika Bayer Urethane Co., Ltd.). The mixture was reacted at 65° C. for 6 hours. After the addition of 94 parts by mass (0.7 mol) of Pine Crystal D-6011 (manufactured by Arakawa Chemical Industries, Ltd., number average molecular weight: 941), 99.4 parts by mass (0.7 mol) of a polyester diol ("P-1050" manufactured by Kuraray Ltd., number average molecular mass: 994), 100 parts by mass (0.7 mol) of a polyethylene ether glycol ("#1000" manufactured by NOF Corporation, number average molecular weight 1002), and 200 parts by mass of MEK, the mixture was reacted at 65° C. for 4 hours. The isocyanate group concentration in the reaction mixture was 1.44 mass %.

After the addition of 27.5 parts by mass (2.02 mol) of dimethylaminoethanol and 200 parts by mass of MEK, the mixture was reacted at 70° C. for 2 hours. The acid number of the reaction product (solid content) was 39 mg KOH/g.

The mixture was then cooled to 35° C. After the addition of 45 parts by mass of N-methylmorpholine and 160 parts by mass of MEK, the mixture was stirred for 30 minutes to obtain the water-dispersible polyurethane resin b having a tertiary amino end group and a nonionic polar chain.

The resulting water-dispersible polyurethane resin 2 had a nonvolatile content of 51.1 mass %, a Gardner bubble viscosity of W, a GPC number average molecular weight of 2795, a mass average molecular weight of 9650, and a ratio of the number of moles of OH groups to the number of moles of NCO groups (number of moles of OH groups/number of moles of NCO groups) of 5/6.

Example 1

(1) Production of Polyurethane Resin-Bonded Pigment 1

165 parts by mass of the water-dispersible polyurethane resin a (nonvolatile content: 58.0 mass %) (water-dispersible polyurethane resin (II)) was added to 1000 parts by mass of Aqua-Black (registered trademark) 162 (manufactured by Tokai Carbon Co., Ltd., solid content: 19.2 mass %, carboxyl group equivalent: 800 μmol/g) (pigment (I)). The mixture was stirred at room temperature for 30 minutes, and then stirred at 40° C. for 1 hour. The reaction solvent (MEK) was distilled off under reduced pressure to obtain a dispersion of a polyurethane resin-bonded pigment 1 (solid content: 30 mass %).

The mass ratio of the pigment (I) to the water-dispersible polyurethane resin (II) (mass of pigment (I)/mass of water-dispersible polyurethane resin (II)) in the polyurethane resin-bonded pigment 1 was 100/50 (on a solid content basis).

(2) Production of Pigment Dispersion Composition 1

66 parts by mass of glycerol, 0.6 parts by mass of an acetylene diol-based surfactant ("Surfynol 104E" manufactured by Nissin Chemical Co., Ltd.), 0.6 parts by mass of triethanolamine, and 132.8 parts by mass of ion-exchanged water were added to 100 parts by mass of the polyurethane resin-bonded pigment obtained in (1) (see Table 1). The mixture was stirred to obtain a pigment dispersion composition 1.

Example 2

(1) Production of Polyurethane Resin-Bonded Pigment 2

103.3 parts by mass of the water-dispersible polyurethane resin b (nonvolatile content: 51.1 mass %) (water-dispersible polyurethane resin (II)) was added to 1000 parts by mass of a water dispersion of the low-oxidized carbon black pigment α having a surface acidic group and obtained by reducing the degree of oxidation of Aqua-Black (registered trademark) 162 (solid content: 20.0 mass %, carboxyl group equivalent: 600 μmol/g) (pigment (I)). The mixture was stirred at room temperature for 30 minutes, and then stirred at 40° C. for 1 hour. The reaction solvent (MEK) was distilled off under reduced pressure to obtain a dispersion of a polyurethane resin-bonded pigment 2 (solid content: 26.0 mass %).

The mass ratio of the pigment (I) to the water-dispersible polyurethane resin (II) (mass of pigment (I)/mass of water-dispersible polyurethane resin (II)) in the polyurethane resin-bonded pigment 2 was 100/30 (on a solid content basis).

(2) Production of Pigment Dispersion Composition 2

66 parts by mass of glycerol, 0.6 parts by mass of an acetylene diol-based surfactant ("Surfynol 104E" manufactured by Nissin Chemical Co., Ltd.), 0.6 parts by mass of triethanolamine, and 132.8 parts by mass of ion-exchanged water were added to 100 parts by mass of the polyurethane resin-bonded pigment 2 obtained in (1) (see Table 1). The mixture was stirred to obtain a pigment dispersion composition 2.

Example 3

(1) Production of Polyurethane Resin-Bonded Pigment 3

103.4 parts by mass of the water-dispersible polyurethane resin a(nonvolatile content: 58.0 mass %) (water-dispersible polyurethane resin (II)) was added to 1000 parts by mass of a water dispersion of the low-oxidized carbon black pigment α having a surface acidic group and obtained by reducing the degree of oxidation of Aqua-Black (registered trademark) 162 (solid content: 20.0 mass %, carboxyl group equivalent: 600 μmol/g) (pigment (I)). The mixture was stirred at room temperature for 30 minutes, and then stirred at 40° C. for 1 hour. The reaction solvent (MEK) was distilled off under reduced pressure to obtain a dispersion of a polyurethane resin-bonded pigment 3 (solid content: 26.0 mass %).

The mass ratio of the pigment (I) to the water-dispersible polyurethane resin (II) (mass of pigment (I)/mass of water-dispersible polyurethane resin (II)) in the polyurethane resin-bonded pigment 3 was 100/30 (on a solid content basis).

(2) Production of Pigment Dispersion Composition 3

66 parts by mass of glycerol, 0.6 parts by mass of an acetylene diol-based surfactant ("Surfynol 104E" manufactured by Nissin Chemical Co., Ltd.), 0.6 parts by mass of triethanolamine, and 132.8 parts by mass of ion-exchanged water were added to 100 parts by mass of the polyurethane resin-bonded pigment 3 obtained in (1) (see Table 1). The mixture was stirred to obtain a pigment dispersion composition 3.

Example 4

(1) Production of Polyurethane Resin-Bonded Pigment 4

138 parts by mass of the water-dispersible polyurethane resin a(nonvolatile content: 58.0 mass %) (water-dispersible polyurethane resin (II)) was added to 1000 parts by mass of a water dispersion of the low-oxidized carbon black pigment α having a surface acidic group and obtained by reducing the degree of oxidation of Aqua-Black (registered trademark) 162 (solid content: 20.0 mass %, carboxyl group equivalent: 600 μmol/g) (pigment (I)). The mixture was stirred at room temperature for 30 minutes, and then stirred at 40° C. for 1 hour. The reaction solvent (MEK) was distilled off under reduced pressure to obtain a dispersion of a polyurethane resin-bonded pigment 4 (solid content: 28.0 mass %).

The mass ratio of the pigment (I) to the water-dispersible polyurethane resin (II) (mass of pigment (I)/mass of water-dispersible polyurethane resin (II)) in the polyurethane resin-bonded pigment 4 was 100/40 (on a solid content basis).

(2) Production of Pigment Dispersion Composition 4

66 parts by mass of glycerol, 0.6 parts by mass of an acetylene diol-based surfactant ("Surfynol 104E" manufactured by Nissin Chemical Co., Ltd.), 0.6 parts by mass of triethanolamine, and 132.8 parts by mass of ion-exchanged water were added to 100 parts by mass of the polyurethane resin-bonded pigment 4 obtained in (1) (see Table 1). The mixture was stirred to obtain a pigment dispersion composition 4.

Example 5

Production of Pigment Dispersion Composition 5

8.85 parts by mass of a polyurethane dispersion ("Hydran AP-40F" manufactured by DIC Corporation, solid content: 23 mass %), 66 parts by mass of glycerol, 0.6 parts by mass of an acetylene diol-based surfactant ("Surfynol 104E" manufactured by Nissin Chemical Co., Ltd.), 0.6 parts by mass of triethanolamine, and 124 parts by mass of ion-exchanged water were added to 100 parts by mass of the polyurethane resin-bonded pigment 3 obtained in (1) of Example 3 (see Table 1). The mixture was stirred to obtain a pigment dispersion composition 5.

The ratio of the mass of the pigment (I) to the total mass of the water-dispersible polyurethane resin (II) and Hydran AP-40F (mass of pigment (I)/(mass of water-dispersible polyurethane resin (II)+mass of Hydran AP-40F)) in the polyurethane resin-bonded pigment 5 was 100/40 (on a solid content basis).

TABLE 1

| | | | | | | (Parts by mass) |
| | | Example 1 | Example 2 | Example 3 | Example 4 | Example 5 |
| --- | --- | --- | --- | --- | --- | --- |
| Pigment | Polyurethane resin-bonded pigment 1 (solid content: 30 mass %) | 100.0 | — | — | — | — |
| | Polyurethane resin-bonded pigment 2 (solid content: 26 mass %) | — | 100.0 | — | — | — |
| | Polyurethane resin-bonded pigment 3 (solid content: 26 mass %) | — | — | 100.0 | — | 100.0 |
| | Polyurethane resin-bonded pigment 4 (solid content: 28 mass %) | — | — | — | 100.0 | — |
| | Hydran AP-40F (solid content: 23 mass %) | — | — | — | — | 8.85 |
| | Glycerol | 66.0 | 66.0 | 66.0 | 66.0 | 66.0 |
| | Surfactant | 0.6 | 0.6 | 0.6 | 0.6 | 0.6 |
| | Amine compound | 0.6 | 0.6 | 0.6 | 0.6 | 0.6 |
| | Ion-exchanged water | 132.8 | 132.8 | 132.8 | 132.8 | 124.0 |
| | Total | 300.0 | 300.0 | 300.0 | 300.0 | 300.0 |

Comparative Example 1

Production of Comparative Pigment Dispersion Composition 1

66 parts by mass of glycerol, 0.6 parts by mass of an acetylene diol-based surfactant ("Surfynol 104E" manufactured by Nissin Chemical Co., Ltd.), 0.6 parts by mass of triethanolamine, and 128.6 parts by mass of ion-exchanged water were added to 100 parts by mass of Aqua-Black (registered trademark) 162 (solid content: 19.2 mass %, carboxyl group equivalent: 800 µmol/g) (see Table 2). The mixture was stirred to obtain a comparative pigment dispersion composition 1.

Comparative Example 2

Production of Comparative Pigment Dispersion Composition 2

66 parts by mass of glycerol, 0.6 parts by mass of an acetylene diol-based surfactant ("Surfynol 104E" manufactured by Nissin Chemical Co., Ltd.), 0.6 parts by mass of triethanolamine, and 132.8 parts by mass of ion-exchanged water were added to 100 parts by mass of a water dispersion of the low-oxidized carbon black pigment α having a surface acidic group (solid content: 20.0 mass %, carboxyl group equivalent: 600 µmol/g) (see Table 2). The mixture was stirred to obtain a comparative pigment dispersion composition 2.

Comparative Example 3

Production of Comparative Pigment Dispersion Composition 3

17.7 parts by mass of a polyurethane dispersion ("Hydran AP-40F" manufactured by DIC Corporation, solid content: 23 mass %), 66 parts by mass of glycerol, 0.6 parts by mass of an acetylene diol-based surfactant ("Surfynol 104E" manufactured by Nissin Chemical Co., Ltd.), 0.6 parts by mass of triethanolamine, and 115.1 parts by mass of ion-exchanged water were added to 100 parts by mass of a water dispersion of the low-oxidized carbon black pigment α having a surface acidic group (solid content: 20.0 mass %, carboxyl group equivalent: 600 µmol/g) (see Table 2). The mixture was stirred to obtain a comparative pigment dispersion composition 3.

The mass ratio of the low-oxidized carbon black pigment α to Hydran AP-40F (low-oxidized carbon black pigment α/Hydran AP-40F) in the comparative pigment dispersion composition 3 was 100/20 (on a solid content basis).

Comparative Example 4

Production of comparative pigment dispersion composition 4

35.4 parts by mass of a polyurethane dispersion ("Hydran AP-40F" manufactured by DIC Corporation, solid content: 23 mass %), 66 parts by mass of glycerol, 0.6 parts by mass of an acetylene diol-based surfactant ("Surfynol 104E" manufactured by Nissin Chemical Co., Ltd.), 0.6 parts by mass of triethanolamine, and 97.4 parts by mass of ion-exchanged water were added to 100 parts by mass of a water dispersion of the low-oxidized carbon black pigment α having a surface acidic group (solid content: 20.0 mass %, carboxyl group equivalent: 600 µmol/g) (see Table 2). The mixture was stirred to obtain a comparative pigment dispersion composition 4.

The mass ratio of the low-oxidized carbon black pigment α to Hydran AP-40F (low-oxidized carbon black pigment α/Hydran AP-40F) in the comparative pigment dispersion composition 4 was 100/40 (on a solid content basis).

TABLE 2

| | | Comparative Example 1 | Comparative Example 2 | Comparative Example 3 | Comparative Example 4 |
|---|---|---|---|---|---|
| Pigment | Aqua-Black 162 (solid content: 19.2 mass %) | 104.2 | — | — | — |
| | Low-oxidized carbon black pigment (solid content: 20.0 mass %) | — | 100.0 | 100.0 | 100.0 |
| | Hydran AP-40F (solid content: 23.0 mass %) | — | — | 17.7 | 35.4 |
| | Glycerol | 66.0 | 66.0 | 66.0 | 66.0 |
| | Surfactant | 0.6 | 0.6 | 0.6 | 0.6 |
| | Amine compound | 0.6 | 0.6 | 0.6 | 0.6 |
| | Ion-exchanged water | 128.6 | 132.8 | 115.1 | 97.4 |
| | Total | 300.0 | 300.0 | 300.0 | 300.0 |

Evaluation of Image Density

Ion-exchanged water was added to each pigment dispersion composition (obtained in Examples 1 to 5 and Comparative Examples 1 to 4) so that the pigment concentration was 6.7 mass % to prepare an inkjet ink composition.

An ink cartridge was charged with the inkjet ink composition, and an image was printed on plain paper using an inkjet printer ("EM-930C" manufactured by Seiko Epson Corporation). The image density was evaluated by measuring the OD value using a spectrodensitometer X-Rite 504 ("X-Rite" manufactured by Nihonheihankizai Co., Ltd.), and evaluating the average OD value in accordance with the following standard. The results are shown in Tables 3 and 4.

Acceptable: The OD value was 1.4 or more.
Fair: The OD value was 1.3 or more and less than 1.4.
Unacceptable: The OD value was less than 1.3.

Evaluation of Storage Stability

The inkjet ink composition (pigment concentration: 6.7 mass %) was put in an airtight glass bottle, and stored at 70° C. for 4 weeks in an incubator. The viscosity (mPa·s) and the particle size (nm) were measured before and after the test, and the storage stability was evaluated in accordance with the following standard. The results are shown in Tables 3 and 4.

Acceptable: The viscosity (or particle size) change rate was within ±5%.

Fair: The viscosity (or particle size) change rate was outside ±5%, but within ±10%.
Unacceptable: The viscosity (or particle size) change rate was outside ±10%.

Resolubility

A drop of the inkjet ink composition (pigment concentration: 6.7 mass %) was allowed to fall onto a Teflon (registered trademark) sheet (n=4), and dried at 50° C. for 1 hour using an incubator. After washing away the inkjet ink composition with ion-exchanged water, the presence or absence of a trace of the ink was observed with the naked eye. The resolubility was evaluated in accordance with the following standard. The results are shown in Tables 3 and 4.

Acceptable: No trace was observed.
Fair: The trace remained to an extent of more than 0% and 30% or less.
Unacceptable: The trace remained to an extent of 70% or more.

Marker Resistance

An ink cartridge was charged with the inkjet ink composition (pigment concentration: 6.7 mass %), and an image was printed on plain paper using an inkjet printer ("EM-930C" manufactured by Seiko Epson Corporation). A line was drawn along the characters printed on the plain paper using a line marker pen ("PM-LM103Y" manufactured by Kokuyo Co., Ltd.), and the marker resistance was evaluated in accordance with the following standard. The results are shown in Tables 3 and 4.

Acceptable: No mark was observed.
Fair: Some marks or blurring was observed in the print area or around the characters.
Unacceptable: The print area was blurred, and marks were observed around the print area.

TABLE 3

|  |  | Example 1 | Example 2 | Example 3 | Example 4 | Example 5 |
|---|---|---|---|---|---|---|
| OD value | | Acceptable | Acceptable | Acceptable | Acceptable | Acceptable |
| Storage stability change rate | Particle size | Acceptable | Acceptable | Acceptable | Acceptable | Acceptable |
| | Viscosity | Acceptable | Acceptable | Acceptable | Acceptable | Acceptable |
| Resolubility | | Acceptable | Acceptable | Acceptable | Acceptable | Acceptable |
| Marker resistance | | Acceptable | Acceptable | Acceptable | Acceptable | Acceptable |

TABLE 4

|  |  | Comparative Example 1 | Comparative Example 2 | Comparative Example 3 | Comparative Example 4 |
|---|---|---|---|---|---|
| OD value | | Acceptable | Acceptable | Fair | Fair |
| Storage stability change rate | Particle size | Acceptable | Unacceptable | Unacceptable | Unacceptable |
| | Viscosity | Acceptable | Fair | Fair | Fair |
| Resolubility | | Acceptable | Fair | Fair | Fair |
| Marker resistance | | Unacceptable | Fair | Fair | Fair |

As is clear from the results shown in Tables 3 and 4, the pigment dispersion compositions respectively including the polyurethane resin-bonded pigments obtained in Examples 1 to 5 exhibited excellent image density, dispersibility, and storage stability, had high resolubility, and formed an ink film (coating) exhibiting excellent marker resistance and rubfastness.

Industrial Applicability

The invention thus provides a pigment that may exhibit excellent image density, dispersibility, storage stability, and resolubility, and may form an ink film (coating) that exhibits marker resistance and rubfastness, and a pigment dispersion composition and an inkjet ink composition that include the pigment.

The invention claimed is:

1. A polyurethane resin-bonded pigment produced by bringing (I) a pigment having a surface acidic group into contact with (II) a water-dispersible polyurethane resin having an acid number on a solid content basis of 20 to 200 mg KOH/g in an aqueous medium, the water-dispersible polyurethane resin (II) having a tertiary amino group only at an end thereof, and having an anionic polar group and optionally a nonionic polar chain in its molecular chain, the water-dispersible polyurethane resin (II) being obtained by reacting (II-a) a polyisocyanate polyurethane resin having an isocyanate end group with (II-b) an alkanolamine, the polyisocyanate polyurethane resin (II-a) being a resin in which a polyol compound having an anionic polar group and optionally a nonionic polar chain that can be dispersed in the aqueous medium and having two or more hydroxyl groups in its molecule, is bonded to a polyisocyanate via a urethane bond, the polyisocyanate being in an excess molar amount with respect to the polyol compound;
   wherein the pigment (I) having a surface acidic group is self-dispersible carbon black having a surface acidic group.

2. The polyurethane resin-bonded pigment according to claim 1, wherein the polyisocyanate is an alicyclic polyisocyanate or an aliphatic polyisocyanate.

3. The polyurethane resin-bonded pigment according to claim 1, wherein the pigment (I) has been treated with a neutralizer.

4. A pigment dispersion composition comprising the polyurethane resin-bonded pigment according to claim 1.

5. A pigment dispersion composition comprising the polyurethane resin-bonded pigment according to claim 2.

6. A pigment dispersion composition comprising the polyurethane resin-bonded pigment according to claim 3.

7. An inkjet ink composition comprising the polyurethane resin-bonded pigment according to claim 1.

8. An inkjet ink composition comprising the polyurethane resin-bonded pigment according to claim 2.

9. An inkjet ink composition comprising the polyurethane resin-bonded pigment according to claim 3.

* * * * *